United States Patent
Engländer

(10) Patent No.: US 11,143,351 B2
(45) Date of Patent: Oct. 12, 2021

(54) CONNECTION DEVICE

(71) Applicant: Leybold GmbH, Cologne (DE)

(72) Inventor: Heinrich Engländer, Linnich (DE)

(73) Assignee: LEYBOLD GMBH, Kolen (DE)

( * ) Notice: Subject to any disclaimer, the term of this patent is extended or adjusted under 35 U.S.C. 154(b) by 545 days.

(21) Appl. No.: 16/060,288

(22) PCT Filed: Dec. 14, 2016

(86) PCT No.: PCT/EP2016/080975
§ 371 (c)(1),
(2) Date: Jun. 7, 2018

(87) PCT Pub. No.: WO2017/108528
PCT Pub. Date: Jun. 29, 2017

(65) Prior Publication Data
US 2018/0363825 A1 Dec. 20, 2018

(30) Foreign Application Priority Data
Dec. 23, 2015 (DE) .......................... 202015008803.1

(51) Int. Cl.
*F16L 51/00* (2006.01)
*F16L 55/04* (2006.01)
(Continued)

(52) U.S. Cl.
CPC ............ *F16L 55/04* (2013.01); *F04D 19/042* (2013.01); *F04D 29/601* (2013.01); *F04D 29/668* (2013.01)

(58) Field of Classification Search
CPC ...... F04D 19/04; F04D 19/042; F04D 17/168; F16L 51/03; F16L 51/035; F16L 51/02;
(Continued)

(56) References Cited

U.S. PATENT DOCUMENTS 1,499,050 A 6/1924 Broome
3,298,980 A 1/1967 Jablin
(Continued)

FOREIGN PATENT DOCUMENTS

CN 101171428 A 4/2008
CN 101595337 A 12/2009
(Continued)

OTHER PUBLICATIONS

International Search Report dated Apr. 10, 2017 for PCT application No. PCT/EP2016/080975.

*Primary Examiner* — Aaron M Dunwoody
(74) *Attorney, Agent, or Firm* — Ohlandt, Greeley, Ruggiero & Perle, LLP

(57) ABSTRACT

A connection device serves for connecting a first tube end, which can be connected to a vacuum pump, to a second tube end which can be connected to a chamber to be evacuated. To this end, the connection element has a tube element for fluidically connecting the vacuum pump to the chamber to be evacuated. The tube element is connected on each side via a connection element to the respective tube end. At least one of the two connection elements is configured here in such a way that it is exclusively suitable for transmitting torques. Furthermore, a decoupling element is provided for mechanically decoupling the at least one connection element, which is exclusively suitable for transmitting torques, from the corresponding tube end.

20 Claims, 2 Drawing Sheets

(51) Int. Cl.

*F04D 19/04* (2006.01)

*F04D 29/66* (2006.01)

*F04D 29/60* (2006.01)

(58) Field of Classification Search

CPC ......... F16L 51/00; F16L 23/24; F16L 23/003; F16L 25/01; F16L 37/62; F16L 37/0887; F16L 37/0915; F16L 37/0927; F16L 37/0982

USPC .................................................. 285/309, 310

See application file for complete search history.

(56) References Cited

U.S. PATENT DOCUMENTS

| 4,523,612 | A | 6/1985 | Kuklo |
| 5,671,956 | A | 9/1997 | Crawford |
| 6,840,736 | B2 | 1/2005 | Ohtachi et al. |
| 9,995,421 | B2 | 6/2018 | Quartarone et al. |
| 2009/0068011 | A1 | 3/2009 | Kalisch et al. |
| 2012/0128484 | A1 | 5/2012 | Hamochi |
| 2015/0362110 | A1* | 12/2015 | Von Keitz .......... F16L 55/1015 285/317 |

FOREIGN PATENT DOCUMENTS

| DE | 202005011679 U1 | 10/2005 |
| DE | 102006004314 A1 | 8/2007 |
| DE | 102008027006 A1 | 6/2009 |
| EP | 2133581 A2 | 12/2009 |
| EP | 1270949 B1 | 10/2010 |
| EP | 2410184 A1 | 1/2012 |
| JP | 2003003988 A | 1/2003 |
| JP | 2006077714 A | 3/2006 |
| JP | 2009097673 A | 5/2009 |
| JP | 2011012777 A | 1/2011 |
| JP | 2011226466 A | 11/2011 |
| WO | 2002086325 A1 | 10/2002 |
| WO | 2005078288 A1 | 8/2005 |
| WO | 2008047168 A1 | 4/2008 |
| WO | 2008101747 A1 | 8/2008 |
| WO | 2015055985 A1 | 4/2015 |

* cited by examiner

CONNECTION DEVICE

BACKGROUND

1. Field of the Disclosure

Connection device for connecting a first tube end, which is adapted to be connected to a vacuum pump, to a second tube end adapted to be connected to a vacuum chamber.

2. Discussion of the Background Art

When connecting a vacuum pump, such as a turbomolecular pump, to a chamber to be evacuated the problem arises that the vacuum pump transmits vibrations occurring in particular due to the rotor rotation to the chamber to be evacuated. This may affect processes or measurements which are carried out in the chamber to be evacuated or in a device connected to the chamber to be evacuated. For example, electron microscopes are extremely susceptible to vibrations.

For damping the vibrations transmitted from the vacuum pump to the chamber to be evacuated it is common practice to provide a damping element between a tube end adapted to be connected to the vacuum pump and a tube end adapted to be connected to the chamber to be evacuated. The damping element comprises a flexible metal bellows, for example, to ensure the vacuum tightness. The metal bellows is surrounded by an elastic damping element, for example. In the case of pump failure, such as blocking of the rotor, for example, such a damping element cannot, however, absorb or transmit the occurring forces and torques. This may lead to a complete destruction of the damping element and thus result in the pump completely detaching from the damping element and/or the chamber to be evacuated. This is very dangerous due to the high kinetic energy of the rapidly rotating rotor.

In addition, a connection element is known from EP 2 410184. It comprises two tube sections, wherein one of the tube sections is fixedly connected to the tube end adapted to be connected to vacuum pump and the second tube section is fixedly connected to the tube end adapted to be connected to the chamber to be evacuated. Between the two tube ends two annular elastomer seals are provided. They are surrounded by a clamp type element which further comprises a web facing inwards and arranged between the two sealing elements. When the vacuum pump is not in operation the two tube sections are pushed apart by the elastomer rings and are mechanically connected by the clip surrounding the tube sections. This mechanical connection, which would also transmit vibrations, is disconnected by the generated vacuum in that the two elastomer rings are compressed and thus the mechanical connection of the two tube sections is disconnected via the clip. However, this connection device is in particular disadvantageous in that the disconnection of the mechanical connection is not clearly defined. For example, it depends on the amount of the generated vacuum. Further, the elasticity properties of the sealing rings change such that they must be regularly exchanged. Furthermore, there is the risk that in the case of a transverse load acting upon the pump the connection element may become permeable.

It is an object of the disclosure to provide a connection device for connecting a first tube element adapted to be connected to a vacuum pump to a second tube element adapted to be connected to a chamber to be evacuated, wherein a good mechanical decoupling is provided while high safety is ensured.

SUMMARY

The connection device serves for connecting a first tube end adapted to be connected to a vacuum pump or a turbomolecular pump to a second tube end, wherein the second tube end is adapted to be connected to a chamber to be evacuated. Here, the first tube end may be part of the vacuum pump and/or the inlet flange of the vacuum pump. Accordingly, the second tube element may be part of the chamber to be evacuated. According to the disclosure, the connection element comprises a tube element for fluidically connecting the vacuum pump to the chamber to be evacuated. The tube element provides the vacuum connection required for evacuation purposes. Thus the tube element comprises a connection element on each side and/or is connected with a connection element. The two connection elements serve for respectively connecting the tube element to one of the two tube ends. At least one of the two connection elements is configured such that it is exclusively suitable for transmitting torques. In particular, during operation the connection element cannot transmit any axial forces, that is forces in the longitudinal direction of the tube element. This ensures that the transmission of vibrations from the vacuum pump to the chamber to be evacuated and/or from the first tube end to the second tube end is not possible or at least strongly reduced. On the other hand, the at least one connection element may transmit torques. These are torques about the longitudinal axis of the tube element which occur in particular in the case of a crash but also when the vacuum pump is started or decelerated. Thus safety is ensured. Preferably, the two connection elements are configured in this way.

According to the disclosure, a decoupling element is provided. The decoupling element serves for mechanically decoupling the at least one connection element, which is exclusively suitable for transmitting tongues, from the corresponding tube end. In particular, the decoupling element serves for mechanically decoupling the two connection elements if the two connection elements are exclusively suitable for transmitting torques. Here, it is preferred that the decoupling element generates an axial force which counteracts the force generated by the vacuum during operation. As a result, when the vacuum pump is not in operation and when the vacuum is reduced due to pump failure, pump crash or the like, the axial force generated by the decoupling element is larger than the counterforce generated by the vacuum. This results in a mechanical connection of the two tube ends such that the occurring torques can be easily transmitted. On the other hand, during operation an axial decoupling takes place due to an equilibrium of forces between the force generated by the decoupling element and the force generated by the vacuum such that the transmission of vibrations is at least strongly reduced.

According to a particularly preferred embodiment, the axial force adapted to be generated by the decoupling element is adjustable. This can be realized with the aid of adjustable springs, for example.

Preferably, the decoupling element comprises at least one fluid chamber filled with a compressible fluid. The fluid is in particular a gas and particularly preferably air. By adjusting the pressure in the at least one fluid chamber the applied axial force can thus be adjusted. Preferably, the decoupling element comprises at least two holding elements. The two holding elements are each adapted to be fixedly connected to one of the tube ends.

Due to the fixed connection between the holding elements and the respective tube ends forces and torques can in particular be transmitted from the tube end adapted to be connected to the vacuum pump to the one holding element and from the other holding element to the chamber to be evacuated. It is also possible to in particular integrally form at least one of the two holding elements with the corresponding tube end or to create an inseparable connection.

Preferably, the fluid chamber is arranged between the two holding elements. An increase of the pressure in the fluid chamber thus causes the two holding elements to be pushed apart.

Preferably, the decoupling element further comprises an outer element which in particular completely surrounds the tube element. Here, the outer element is preferably of an annular configuration. Preferably, the outer element overlaps the two holding elements in the axial direction, wherein the outer element can also be fixedly connected to one of the two holding elements or be integrally formed therewith. Preferably, the outer element is not fixedly connected to any one of the two holding elements. The outer element is thus in particular adapted to be displaced in the axial direction relative to one of the two holding elements and preferably to both holding elements and/or a corresponding axial relative movement is possible.

Preferably, a first sealing element is arranged between the outer element and the holding element adapted to be displaced relative to the former. The sealing element is in particular an elastic sealing element, in particular a sealing ring surrounding the holding element. The sealing ring essentially does not transmit any forces, in particular vibrations.

In addition, it is preferred that a second sealing element is provided which is arranged between the outer element and the second holding element which is adapted to be in particular displaced in the axial direction relative to the outer element. The second sealing element is preferably configured such that it corresponds to the first sealing element.

Further, it is preferred that between the tube element and the two holding elements a respective sealing element is arranged. This is preferably configured such that it corresponds to the first sealing element so that it also essentially does not transmit any forces or vibrations.

According to a preferred embodiment, the fluid chamber is delimited by the outer element, the tube element and the two holding elements. The delimitation is here in particular realized by an inner face of the outer element as well as an opposite outer face of the tube element. The holding elements delimit the fluid chamber in particular with their front faces. According to a preferred embodiment, the fluid chamber is of an annular configuration and in particular completely surrounds the tube element. Thereby a uniform force in the axial direction can be generated. A change of the force in particular in the circumferential direction of the preferably annular fluid chamber is thereby avoided.

According to a particularly preferred embodiment, the fluid chamber is connected to a supply duct. The supply duct serves for supplying a fluid, in particular a gas. Preferably, a valve is arranged in the supply duct. Thus it is easily possible to vary the pressure in the fluid chamber and adapt it to an operating condition. Thereby decoupling is realized during operation such that essentially no vibrations are transmitted from the vacuum pump to the chamber to be evacuated.

In addition, it is preferred that the in particular annularly configured outer element is fixedly connected to the tube element via a web element. This may serve for simplifying the installation via a screw connection, for example. It is further possible to integrally form the tube element with the outer element.

According to a further preferred embodiment, the decoupling element comprises two fluid chambers. They are in particular arranged in series in the axial direction such that each fluid chamber essentially acts upon one of the two holding elements. Here, it is particularly preferred that the pressures of the two fluid chambers are separately adjustable. For this purpose, it is preferably intended that one duct per fluid chamber is provided for supplying and discharging a compressible fluid, such as gas, and that preferably a valve is arranged in each duct.

According to a preferred embodiment, the at least one transmission element suitable for transmitting torques is configured such that axially arranged projections are provided which extend into recesses. For example, the projections are provided at the connection element and the recesses are provided at the holding element. In this embodiment, the projections provided at the connection element face the recesses provided at the holding element. Likewise, the projections can also be provided at the connection element.

Since torques are to be transmitted via the connection element only in the case of damage of the vacuum pump or during acceleration or deceleration of the vacuum pump, it is preferred that the cross-section of the recesses is larger than the cross-section of the projections. Thereby it is ensured that during normal operation no torques and thus no vibrations are transmitted.

Preferably, the two connection elements are configured as described above and refined in a preferable manner.

First, the pressure provided in the at least one fluid chamber creates a connection in the axial direction between the two tube ends between which the connection element is arranged. According to a preferred embodiment, this is in particular realized in that the projections of the connection elements rest upon the bottom of the corresponding recesses. Once the vacuum pump has generated a vacuum an axial counterforce is produced which counteracts the axial force generated by the pressure in the at least one fluid chamber. This leads to disconnection of the mechanical connection and thus decoupling.

It is particularly preferred to provide a marking which allows for easily detecting from outside whether a decoupling has taken place at the adjusted vacuum and the adjusted pressure in the at least one fluid chamber. For this purpose, a marking may be provided at the outer element and/or at least one of the holding elements.

Hereinafter the disclosure is explained in detail on the basis of preferred embodiments with reference to the accompanying drawings.

DETAILED DESCRIPTION OF THE PREFERRED EMBODIMENT

Figure 1:
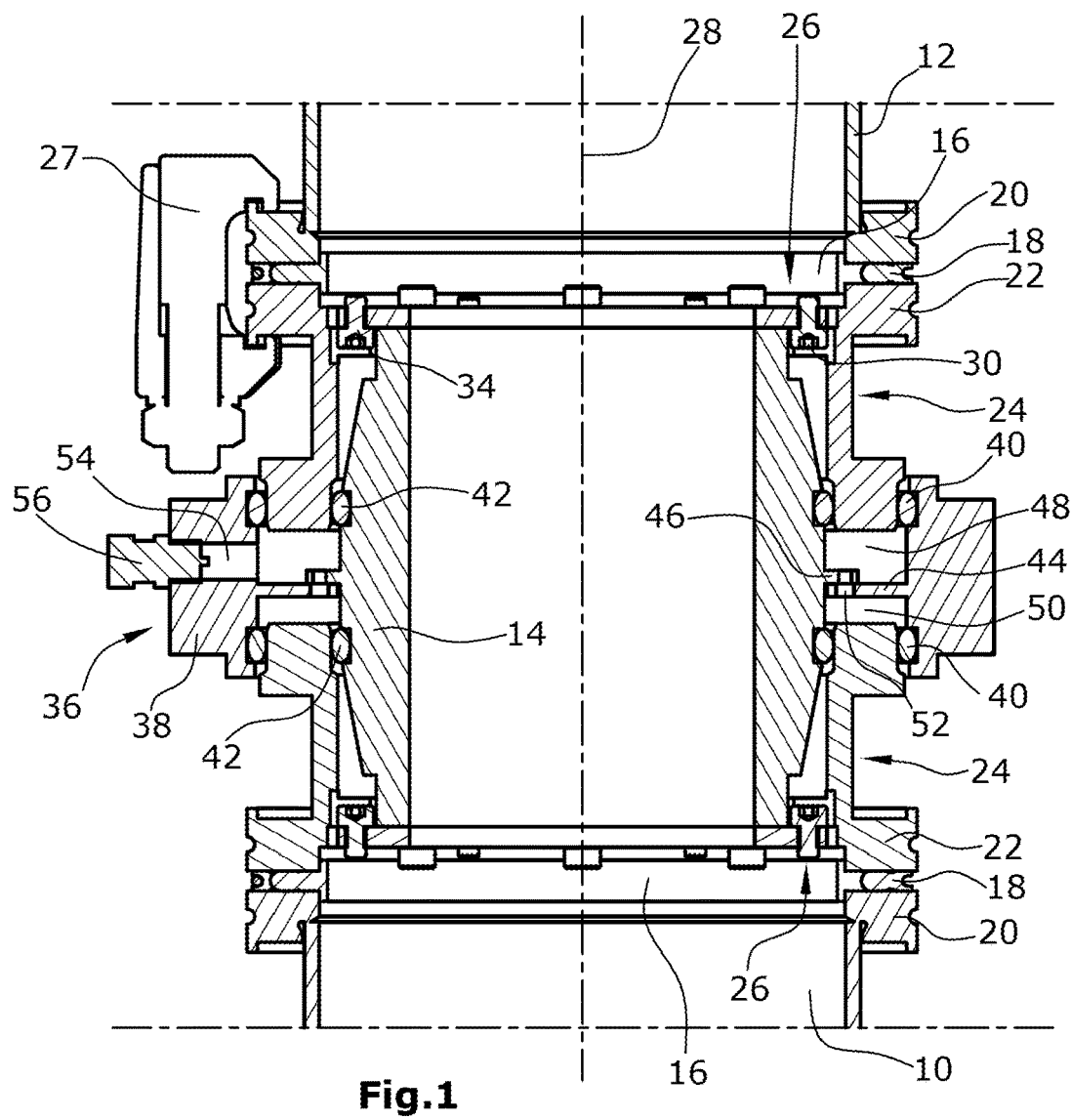
FIG. 1 shows a schematic sectional view of a preferred embodiment of a connection device according to the disclosure.

The connection device serves for connecting a first tube end 10, which is in particular connected to a vacuum pump, to a second tube end 12 which is in particular connected to a chamber to be evacuated. For the fluidic connection a tube element 14 is provided. The latter is connected at its two opposite ends to a respective connection ring 16 in particular via fastening screws not illustrated. The ring 16 comprises a centering ring 18 having a seal. The centering ring 18 is respectively arranged between flanges 20 of the two tube ends 10, 12 and flanges 22 opposite to the former. The flanges 22 are respective parts of two holding elements 24. The holding elements 24 are each of an annular configuration and surround the tube element 14. The two holding elements 24 are each fixedly and thus rigidly connected to the first tube end 10 and/or to the second tube end 12 via clamps 27.

The tube element 14 is connected to the two tube end 10, 12 via connection elements 26, wherein the two holding elements 24, too, are component parts of the connection element 26. Here, the connection is realized such that via the connection torques can be transmitted in particular in the case of failure of the vacuum pump. These are the torques occurring about a longitudinal axis 28. In the axial direction, i.e. in the direction of a longitudinal axis 28, at least a slight displacement of the tube element relative to the two tube ends 10, 12 and/or relative to the holding elements fixedly connected to the two tube ends 10, 12 is possible. For this purpose, the holding elements 24 (FIG. 2) comprise a projection 30 facing radially inwards. The projection 30 comprises recesses 32 into which projections 34 (FIG. 1) extend. In the illustrated exemplary embodiment, the projections 34 are screw heads. Here, the diameter of the recesses 32 is slightly larger than the diameter of the screw heads 34.

In addition, the connection device comprises a decoupling element 36. This serves for mechanically decoupling the two connection elements 26 from the two tube ends 10, 12 such that no axial forces, i. e. forces which can pass along the longitudinal axis 28, can be transmitted and/or the transmission of which is considerably reduced. Thus there is no and/or only a minor transmission of vibrations from the vacuum pump to the chamber to be evacuated and the components connected thereto. In the illustrated exemplary embodiment, the decoupling element 36 comprises an annularly configured outer element 38. The outer element 38 is adapted to be displaced relative to the two annularly configured holding elements 24 in the axial direction, i. e. the longitudinal direction 28. Between the outer element 38 and the two holding elements 24 a respective annular sealing element 40 is arranged.

On an inner face of the two holding elements 24 an annular sealing element 42 for sealing towards the tube element 14 may be provided. In particular, in this area, too, an axial mobility between the holding elements 24 and the tube element 14 is allowed for.

The outer element 38 of the decoupling element 36 is connected to the tube element 14 via a web element 44. This is a fixed connection, wherein the web element 44 is connected to a web-shaped projection 46 of the tube element 14 via a screw connection, for example. An axial movement of the tube element 14 always causes an axial movement of the outer element 38.

Figure 2:
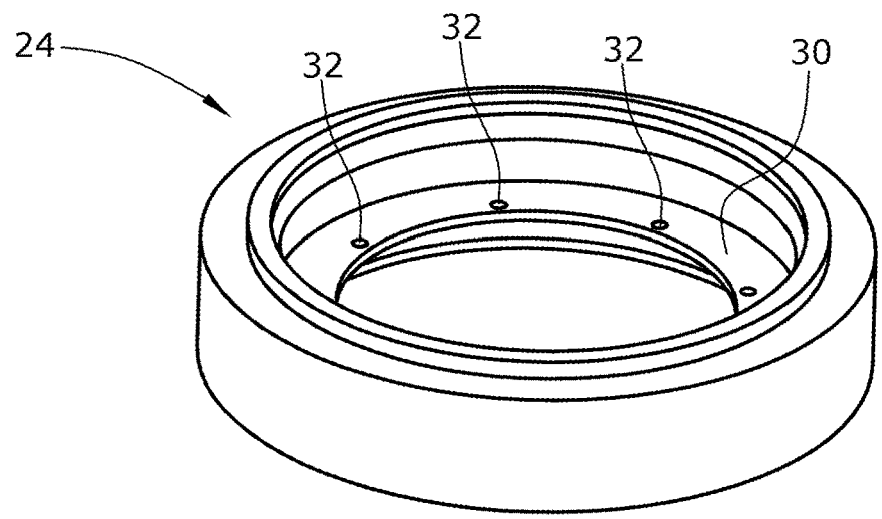
FIG. 2 shows a schematic sectional view of a connection element.

For realizing axial movements two fluid chambers 48, 50 are formed which, in the exemplary embodiment illustrated in FIG. 1, are fluidically connected to each other via a connection duct 52 provided in the webs 44, 46. The fluid chambers 48, 50 are thus delimited by an inner face of the outer element 38, front faces of the two holding elements 24 and an outer face of the tube element 14. The fluid chambers 48, 50 comprise a supply duct 54 in which a valve 56 is arranged. Via the valve 56 a fluid, in particular compressed air, can thus be supplied to or discharged from the two fluid chambers 48, 50.

For axially decoupling the two tube ends 10, 12 and thus for avoiding and in particular reducing the transmission of vibrations it is possible, with the aid of the connection device according to the disclosure, to build up a pressure in the fluid chambers 48, 50. This results in the two opposite annular holding elements 24 being pushed apart. Prior to taking the vacuum pump into operation this results in an axial connection between the two tube ends 10, 12 since the projections and/or screw heads 34 each axially rest upon the bottom of the recesses 32. During operation a vacuum is generated in the tube element 14 and additionally in the two tube ends 10, 12 by the vacuum pump. Thereby a counter-force is produced. In the case of a corresponding force ratio this causes the projections 34 to no longer rest upon the bottom area of the recesses 32.

For ensuring reliable decoupling the pressure in the fluid chambers 48, 50 must thus be adapted to the vacuum. According to the disclosure, this is possible in a simple manner by supplying or discharging compressed air through the supply duct 54.

In addition, it is preferred that at the outer ring 38 and/or one of the two holding elements 24 a marking is provided such that the position of the outer ring 38 and thus of the tube element 14 relative to the holding elements 24 can be read in a simple manner. Thereby the required pressure in the fluid chambers 48, 50 can be determined in a simple manner in order to ensure axial decoupling.

Figure 3:
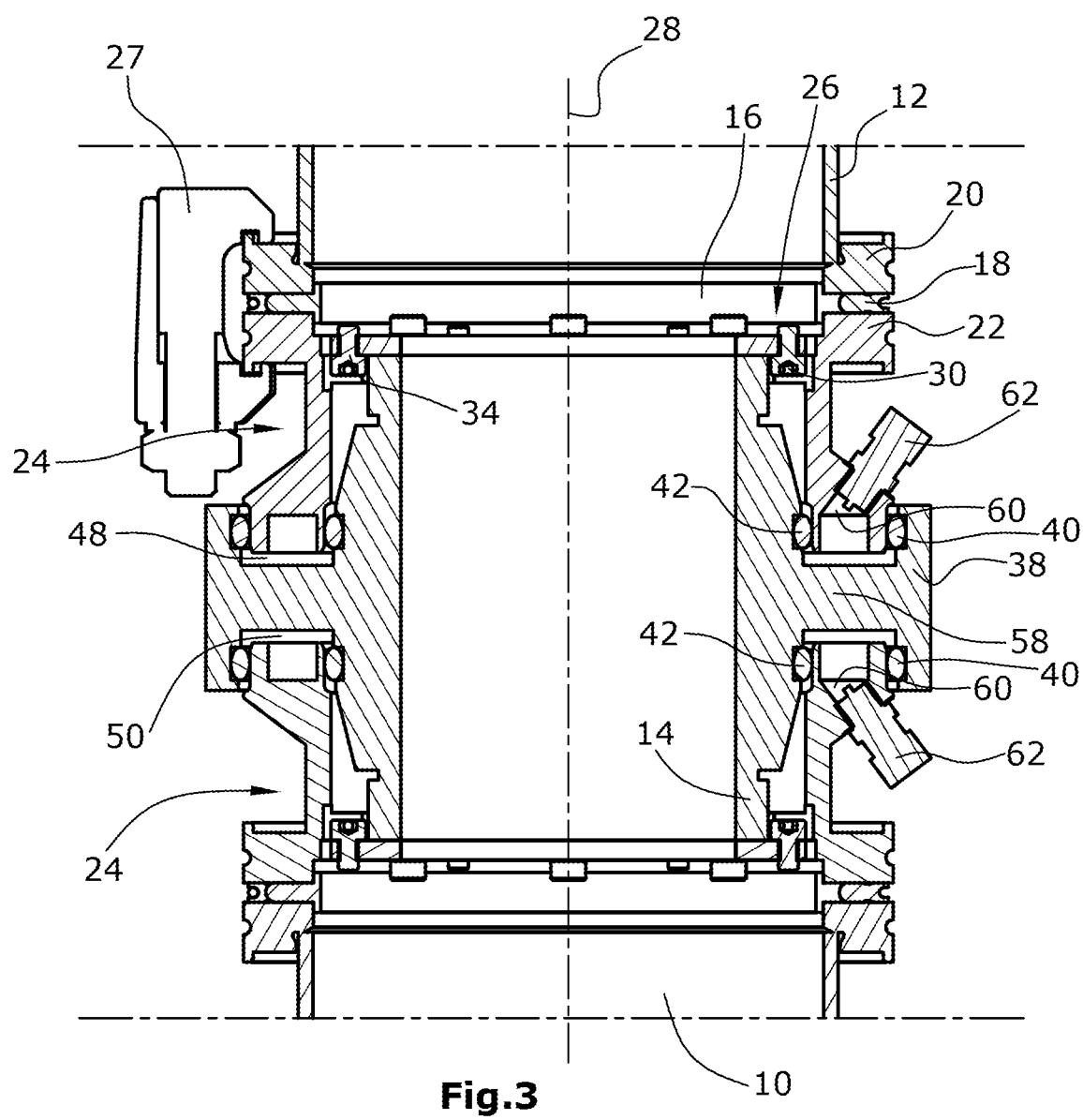
FIG. 3 shows a schematic sectional view of a second embodiment of a connection device according to the disclosure.

In the embodiment illustrated in FIG. 3 similar and identical components are designated by the same reference numerals.

The essential difference is that the outer ring 38 is integrally formed with the tube element 14. In the illustrated exemplary embodiment, the connection is realized via a solid web 58. In the illustrated exemplary embodiment, the web 58 does not comprise any bores for connecting the two fluid chambers 48, 50. Rather, for each fluid chamber 48, 50 a respective supply duct 60 is provided in which a respective valve 62 is arranged. Thereby it is possible to adjust the pressures in the two fluid chambers 48, 50 independently of each other such that a fine adjustment is possible. Thus in this embodiment, too, it is preferred that two markings are provided, wherein one marking shows the relative position between the outer element 38 and a holding element 24, which is the upper one in FIG. 1, and the second marking shows the relative position to the holding element 24 which is the lower one in FIG. 3.

What is claimed is:
1. A connection device for connecting a first tube end adapted to be connected to a vacuum pump to a second tube end adapted to be connected to a chamber to be evacuated, comprising:
   a tube element for fluidically connecting said vacuum pump to said chamber to be evacuated,
   wherein said tube element comprises a first connection element on one side of the tube element and a second connection element on a second side of the tube element, wherein the first connection element is config- ured to connect to the first tube end and the second connection element is configured to connect to the second tube end, wherein at least one of the first and second connection elements is exclusively suitable for transmitting torques, and a decoupling element for mechanically decoupling the at least one of the first and second connection elements from the first and second tube end, respectively, wherein the decoupling element comprises at least one fluid chamber.

2. The connection device according to claim 1, wherein the force is an axial force and wherein adjustment of the axial force is carried out by changing pressure in the at least one fluid chamber.

3. The connection device according to claim 1, wherein the decoupling element comprises two holding elements which are adapted to be fixedly connected to the first and second tube ends, respectively.

4. The connection device according to claim 3, wherein the fluid chamber is arranged between the two holding elements.

5. The connection device according to claim 4, wherein the decoupling element comprises an outer element which completely surrounds the tube element.

6. The connection device according to claim 5, wherein the outer element is of an annular configuration.

7. The connection device according to claim 5, wherein the outer element is adapted to be axially displaced relative to at least one of the two holding elements.

8. The connection device according to claim 7, further comprising a first sealing element arranged between the outer element and the at least one of the two holding elements.

9. The connection device according to claim 8, further comprising a second sealing element which is arranged between the outer element and another of the two holding elements which is adapted to be axially displaced.

10. The connection device according to claim 5, wherein the at least one fluid chamber is delimited by the outer element, the tube element and two holding elements.

11. The connection device according to claim 5, wherein the outer element is fixedly connected with the tube element via a web element.

12. The connection device according to claim 5, wherein the outer element and/or the two holding elements comprise a marking for indicating a mechanical decoupling during operation.

13. The connection device according to claim 3, wherein between the tube element and the two holding elements a respective sealing element is arranged.

14. The connection device according to claim 1, wherein the at least one fluid chamber annularly surrounds the tube element.

15. The connection device according to claim 1, wherein the at least one fluid chamber comprises a supply duct in which a valve is arranged.

16. The connection device according to claim 1, wherein the decoupling element comprises two fluid chambers whose pressures are adapted to be adjusted separately from each other.

17. The connection device according to claim 1, wherein at least one of the first and second connection elements is exclusively suitable for transmission of torques and comprises axially arranged projections which extend into a recesses.

18. The connection device according to claim 17, wherein the recess comprises a cross-section that is larger than a cross-section of the axially arranged projections such that no torques are transmitted during normal operation.

19. A connection device for connecting a first tube end adapted to be connected to a vacuum pump to a second tube end adapted to be connected to a chamber to be evacuated, comprising:

a tube element for fluidically connecting said vacuum pump to said chamber to be evacuated, wherein said tube element comprises a first connection element on one side of the tube element and a second connection element on a second side of the tube element, wherein the first connection element is configured to connect to the first tube end and the second connection element is configured to connect to the second tube end, wherein at least one of the first and second connection elements is exclusively suitable for transmitting torques, and a decoupling element for mechanically decoupling the at least one of the first and second connection elements from the first and second tube end, respectively, wherein a force generated by the decoupling element is adjustable.

20. A connection device for connecting a first tube end adapted to be connected to a vacuum pump to a second tube end adapted to be connected to a chamber to be evacuated, comprising:

a tube element for fluidically connecting said vacuum pump to said chamber to be evacuated, wherein said tube element comprises a first connection element on one side of the tube element and a second connection element on a second side of the tube element, wherein the first connection element is configured to connect to the first tube end and the second connection element is configured to connect to the second tube end, wherein at least one of the first and second connection elements is exclusively suitable for transmitting torques, and a decoupling element for mechanically decoupling the at least one of the first and second connection elements from the first and second tube end, respectively, wherein the first and second connection elements are exclusively suitable for transmitting torques.

* * * * *